March 6, 1951     C. L. PROKOP     2,543,868
SEALING OF POROUS FORMATIONS
Filed Jan. 30, 1948
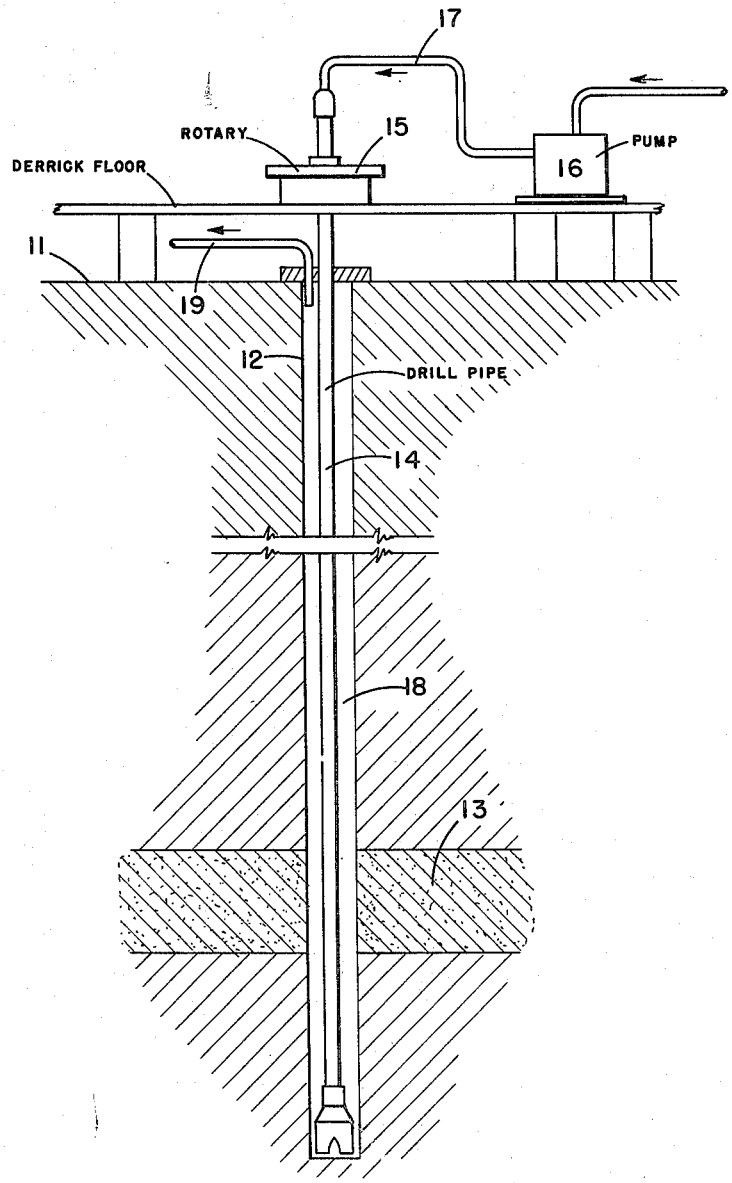
Charles L. Prokop, INVENTOR.
BY
J. G. McKean
ATTORNEY

UNITED STATES PATENT OFFICE 2,543,868

SEALING OF POROUS FORMATIONS

Charles L. Prokop, Houston, Tex., assignor, by mesne assignments, to Standard Oil Development Company, Elizabeth, N. J., a corporation of Delaware Application January 30, 1948, Serial No. 5,442

6 Claims. (Cl. 166—22)

This invention relates to an improved method for sealing porous formations. More particularly, it relates to an improved method for sealing porous formations penetrated by boreholes drilled by the rotary drilling method for the production of fluids, particularly oil and gas.

In drilling boreholes into subsurface formations for the production of fluids therefrom, earth formations of varying degrees of porosity are penetrated. Some of the formations encountered will be relatively impervious to the passage of fluids while others will be of a highly permeable nature. These formations may occur close to the earth's surface or may occur at great depth. The permeable formations encountered during drilling operations may be very troublesome, particularly when encountered at depth. For example, the fluids present in drilling mud may filter into the formation and thereby materially alter the properties of the mud. It may even occur that the formations are sufficiently permeable to permit the mud itself to flow into the formation, thereby resulting in serious mud losses, a condition often denominated "loss of returns."

Drilling mud having the proper consistency is necessary for the drilling of boreholes. This mud is circulated down through the drill stem pipe, out through the eyes of the bit and upwardly through the annulus between the drill stem pipe and the borehole walls. Drilling mud serves a number of purposes among which are lubrication of the drill bit, the carrying of cuttings to the surface where they may be disposed of, and the coating of the borehole walls to prevent loss of returns. When, however, an extremely permeable formation is penetrated by a borehole, the drilling mud cannot properly coat the walls of the borehole and, consequently, drilling mud or fluids contained therein are lost to the formation. In some cases, the loss of drilling mud is so great that none returns to the surface. Serious consequences may follow when such a situation prevails.

Various methods have been developed for sealing such formations against the passage of fluids from the borehole into the formation. For example, it is known to cement such formations. It is also known to employ methods involving the use of various different types of resins which harden to a solid mass in the formation and thus prevent the passage of fluids from the borehole into the formation. Such methods are subject to a number of disadvantages, not the least of which is the necessity for drilling the hardened cement or resin from the borehole adjacent the plugged formation before normal drilling operations may be resumed. This difficulty is avoided in the process of my invention.

In the process of my invention I take advantage of the fact that the temperatures prevailing at the depth to which boreholes are normally drilled for the production of oil and gas are above atmospheric temperature. As a matter of fact, it is known that temperatures as high as about 300° F. prevail in formations occurring at a depth of approximately 15,000 feet. Even at depths of approximately 2,000 feet, temperatures in the order of 120° F. are known.

It is an object of this invention to provide a method for sealing permeable formations. It is a further object of my invention to provide a method wherein it will be unnecessary to drill out a solid material adjacent the permeable formation before normal drilling operations may be resumed.

In carrying out my invention, water containing methyl cellulose is introduced into the borehole opposite the permeable formation in order to seal the formation against the passage of fluids from the borehole. By admixing methyl cellulose with water, a solution is formed which will gel on heating. As previously indicated, the temperatures of subsurface formations, depending on their depth, may vary from a temperature in the neighborhood of atmospheric temperature near the earth's surface to temperature in excess of 300° F. at depth. In the practice of my invention, I take advantage of this fact inasmuch as I add a sufficient quantity of methyl cellulose to the water to cause the resulting solution to gel at the temperature prevailing in the formation to be sealed. The resulting gel effectively seals the formation against further passage of fluids or drilling mud from the borehole.

Methyl cellulose employed in accordance with my invention may be prepared by methylating cellulose. The properties of methyl cellulose prepared by this method will depend upon a number of factors among which are:

(1) The source of raw cellulose, (2) The temperature and time of contact of the cellulose with and the concentration of the caustic alkali solution used to prepare the cellulose material for methylation, and (3) The degree to which the cellulose is methylated. Methylation of the cellulose may be accomplished in various ways and one well-known method consists of contacting caustic treated cellulose with methyl chloride, thereby substituting a methyl group for a hydrogen atom attached to the cellulose molecule. It has been postulated that the reaction occurs in the following manner:

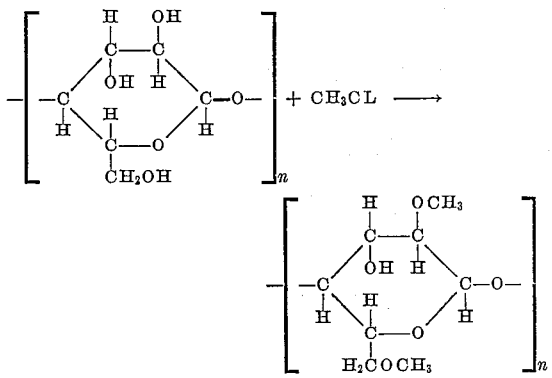

In view of the complexity of methyl cellulose molecule and of the various side reactions which might conceivably take place through methylation, it will be appreciated that the ordinary physical tests usually applied to identify chemical compounds cannot be readily applied to methyl cellulose. However, the character of the resulting methylated molecule may be indicated by the viscosity of an aqueous solution in which the methyl cellulose has been dissolved. Thus, when two grams samples of methyl cellulose prepared under different conditions are dissolved in 98 grams of water, the viscosity of the resulting solutions will vary over a wide range, thereby indicating the complexity of the molecules. For example, a methyl cellulose may be prepared such that when two grams are dissolved in 98 grams of distilled water, the resulting solution will have a viscosity at 20° C. of 15 centipoises. It is also possible to prepare a methyl cellulose such that when 2 grams are dissolved in 98 grams of distilled water, the resulting solution will have a viscosity at 20° C. of 4,000 centipoises. Methyl cellulose of intermediate viscosities may, of course, also be prepared.

In the practice of my invention I have found that any methyl cellulose having such properties that its 2% aqueous solution has a viscosity at 20° C. in the range from 15 to 4,000 centipoises may be effectively employed. Normally, as little as .6 weight per cent may be dissolved in water for effective results although as much as 15 weight per cent may be effectively employed under certain circumstances. For example, when it is desired to seal a permeable formation occurring relatively close to the earth's surface, the temperature of the formation will normally be only slightly above atmospheric temperature and consequently it may be necessary to employ as much as 15 weight per cent methyl cellulose. When it is desired to seal a permeable formation which is at great depth, for example, 12,000 or 14,000 feet, as little as 0.6 weight per cent may be employed with effective results. The amount of methyl cellulose required will also depend to some extent upon the source of cellulose employed and upon the conditions maintained during its preparation. In general, a methyl cellulose which imparts a high viscosity to water is more effective in the lower concentrations than is a methyl cellulose which is less effective in increasing the viscosity of water. Of course, a methyl cellulose should be selected which has the necessary characteristics to cause an aqueous solution thereof to gel at the temperature prevailing in the formation to be sealed.

*Example I*

In one series of tests illustrating the effectiveness of the method of my invention, a Baroid high pressure filter press was filled with clean, unconsolidated 20 to 30 mesh Corrigon sand to prepare a bed 3 inches deep and 2.1 inches in diameter. The sand was saturated with water and heated to about 150° F. An aqueous solution of methyl cellulose containing 6% by weight of methyl cellulose was introduced into the filter press, forced into the sand and allowed to set for 10 minutes. The solution readily entered the sand. The methyl cellulose employed had previously been prepared in such a manner that when two grams of the methyl cellulose were dissolved in 98 grams of distilled water the viscosity of the resulting solution at 20° C. was 25 centipoises. After the sample had remained in the filter press for 10 minutes, a 100 lb./sq. in. pressure differential was then applied across the sand bed and the filtration rate noted. The average rate of flow was 2.5 cc. per minute, the effluent being a very dilute solution of methyl cellulose. A drilling mud was then placed on top of this treated sand bed and the filtration rate of the mud at 100 lbs./sq. in. pressure differential was noted. The filtration rate continuously decreased, and at the end of 45 minutes after admission of the mud the filtration rate had decreased to about 1 drop of effluent every 2 or 3 minutes.

The above mentioned drilling mud was prepared by suspending in water a mixture of Wyoming bentonite and El Paso clay, the latter being a Texas surface clay widely used in making commercial drilling muds. Caustic soda and quebracho were added to the mud, the final composition of which was as follows:

| Material: | Weight per cent |
|---|---|
| Wyoming bentonite | 2.4 |
| El Paso clay | 17.1 |
| Sodium hydroxide | 0.2 |
| Quebracho | 0.3 |
| Water | 80.0 |

This mud had a viscosity of 17.3 centipoises at 600 R. P. M. Stormer and a filtration rate of 9.8 cc. in 30 minutes as measured by the conventional low pressure API mud test. When placed above a bed of clean, unconsolidated 20 to 30 mesh Corrigon sand untreated with methyl cellulose solution, this mud flowed freely through the bed.

*Example II*

In another series of tests, a conventional low pressure API mud filter cylinder was filled with spherical cement balls and glass marbles. The cement balls ranged in size from about 0.3 inch in diameter to about 0.8 inch in diameter. All the marbles were approximately .65 inch in diameter. The marbles constituted about 80% of the solid objects in the cylinder while the cement balls constituted the remaining 20%. The base of the filter press had previously been drilled so that there were two slots about ¼ inch wide and ½ inch long in the bottom of the cylinder. During this test no screen was used in the bottom of the press. After the mud filter had been filled with cement balls and glass marbles, a 6% solution of methyl cellulose was poured into the cylinder. The methyl cellulose used in this series of tests had been previously prepared in such a manner that when 2 grams were dissolved in 98 grams of distilled water, the viscosity at 20° C. of the resulting solution was 25 centipoises. After introduction of the methyl cellulose solution, the cylinder was immersed in a water bath which was maintained between 180° F. and 200° F. After permitting the contents of the cylinder to remain in the water bath undisturbed for 30 minutes, additional amounts of cellulose were forced into the cylinder through the top under a pressure of 20 lbs./sq. in. An effluent consisting of dilute methyl cellulose was observed to flow from the bed. Filtration was permitted to continue for approximately 15 minutes during which time the pressure was slowly increased to 45 lbs./sq. in. at which pressure concentrated methyl cellulose was forced from the cylinder as an effluent. The pressure in the cylinder was then released, and again built up and filtration continued at 40 lbs./sq. in. After 20 minutes additional filtration time, the pressure was increased to 65 lbs./sq. in. before another flow of concentrated methyl cellulose occurred. After the expiration of a second 20 minute period, the pressure was increased but no appreciable quantity of effluent was observed until the pressure had been increased to approximately 95 lbs./sq. in.

The above described tests indicate that methyl cellulose solutions may be used with effectiveness to seal permeable formations. Not only are such solutions effective in sealing formations consisting essentially of particles having a size similar to that of ordinary sand but are also effective in sealing formations which consist of relatively large particles, such, for example, as are encountered in gravel beds.

Referring now to the drawing, the use of methyl cellulose solution for sealing porous subsurface formations traversed by a borehole is illustrated in which numeral 11 designates the surface of the earth, 12 designates the walls of a borehole which traverse a permeable formation 13, and 14 designates a drill pipe supported in the borehole by means of a rotary table 15. During drilling operation, drilling mud is forced by means of pump 16 through line 17 through drill pipe 14 into the borehole where it passes upwardly through the annular space 18 between drill pipe 14 and borehole walls 12 then out through line 19. When it is desired to seal permeable formation 13, the aqueous methyl cellulose solution of my invention is pumped through line 17 by pump 16 or by an auxiliary pump, not shown, into drill pipe 14 where it displaces drilling mud downwardly out of drill pipe 14 and upwardly in annular space 18. The methyl cellulose solution is pumped into the borehole until the upper level of the solution in annular space 18 is at least as high as the upper level of permeable formation 13. When the methyl cellulose has reached the above mentioned level, additional solution may be pumped into line 17 with outlet line 19 closed so that the solution is forced into the permeable formation. Such a pressure operation, however, may not be necessary and in many instances the weight of the mud in the annulus above the solution may be relied upon to supply sufficient pressure. In either event, as the methyl cellulose solution is forced into the permeable formation, it is heated by the heat available in the formation and when heated to the gellation temperature the solution gels and forms an effective seal against the passage of further fluid. After the seal has been formed, the methyl cellulose solution remaining in the bore hole is removed from the bore hole by any of the well-known methods such, for example, as water washing or mud circulation, and conventional drilling operations are then resumed.

In the practice of my invention, neither the method of preparation of the methyl cellulose nor the concentration of methyl cellulose in the solution is particularly critical. All that is necessary is to employ a solution that will gel in the temperature range between that of the circulating mud and the formation temperature. For example, if the temperature of the formation to be sealed is 135° F., and a methyl cellulose which will impart a viscosity at 20° F. of 25 centipoises when 2% is dissolved in distilled water is available, any solution concentration between about 4.5 weight per cent and 12 weight per cent might be satisfactorily used. On the other hand, if a methyl cellulose which will impart a viscosity at 20° C. of 4,000 centipoises when 2% is dissolved in water is available, as little as 1.5 weight per cent might well be used although as much as 10 weight per cent would also give effective results. Since the methyl cellulose accumulates in the porour media at gellation temperature and thereby increases its concentration, it will ordinarily be desirable to employ aqueous solutions in which the methyl cellulose is dissolved in lower concentrations than solutions in which it is dissolved in higher concentrations. In most instances a concentration of from 6.0% to 8.0% by weight will be found preferable.

While this invention has been described as applied to the sealing off of a porous formation traversed by a borehole, it will be understood that it can be used for any purpose wherein it is desired to seal a porous media.

What I claim is:

1. A method for sealing permeable formations traversed by a borehole which comprises injecting into the said formation a sufficient quantity of an aqueous solution of methyl cellulose to form an effective seal against the passage of drilling mud from the borehole into the formation.

2. A process in accordance with claim 1 in which the concentration of methyl cellulose ranges from 0.6% to 15% by weight of the solution.

3. A method for sealing a permeable formation traversed by a borehole against the passage of fluid from the drilling mud into the said formation which comprises introducing into the said formation water containing a sufficient quantity of methyl cellulose to cause gellation of the water-methyl cellulose mixture at the temperature prevailing in the said formation.

4. A method in accordance with claim 3 in which the concentration of methyl cellulose ranges from .6% to 15% by weight of the solution.

5. A method for sealing a permeable formation traversed by a borehole which comprises introducing into said formation a sufficient quantity of an aqueous solution of methyl cellulose to form an effective seal against the passage of drilling mud from the bore hole into the formation, the said methyl cellulose being of such character that a 2% aqueous solution thereof has a viscosity at 20° C. in the range from 15 to 4,000 centipoises.

6. A method in accordance with claim 5 in which the concentration of methyl cellulose ranges from .6% to 15% by weight of the solution.

CHARLES L. PROKOP.

REFERENCES CITED

The following references are of record in the file of this patent:

UNITED STATES PATENTS

| Number | Name | Date |
|---|---|---|
| 2,252,669 | Cross | Aug. 12, 1941 |
| 2,353,372 | Stone | July 11, 1944 |
| 2,439,833 | Wagner | Apr. 20, 1948 |
| 2,440,626 | Young et al. | Apr. 27, 1948 |